United States Patent Office 3,068,304
Patented Dec. 11, 1962

3,068,304
SEPARATION OF ACETYLENIC IMPURITIES USING A CUPROUS AND CUPRIC CHLORIDE SOLUTION
Marshall L. Spector, Livingston, N.J., assignor to The M. W. Kellogg Company, Jersey City, N.J., a corporation of Delaware
No Drawing. Filed June 10, 1960, Ser. No. 35,131
20 Claims. (Cl. 260—677)

This invention relates to the separation of acetylenic impurities, and, in one of its aspects, relates to the separation of acetylenic impurities from mixtures thereof with hydrocarbons. Still more particularly, in this aspect, the invention relates to the separation of acetylenic impurities from mixtures thereof with olefins obtained by the pyrolysis of hydrocarbons, employing a novel method of selective or preferential polymerization.

In the commercial production of monoolefins, such as ethylene or propylene, or diolefins, such as isoprene or butadiene, and other unsaturated compounds, by the pyrolysis of hydrocarbons, such as naphtha feed-stocks, it is important that the olefin be produced in a high degree of purity. In this respect, it has been found, however, that the pyrolysis reaction also produces a high degree of acetylenic impurities, such as acetylene or methyl acetylene, whose presence impairs the efficacy of the olefin when subsequently subjected to further treatment to render the latter suitable for commercial utility. Of particular importance is the necessity to remove these acetylenic impurities from monoolefins, such as ethylene and propylene, or from diolefins, such as isoprene and butadiene, when it is desired to subject these monomeric compounds to polymerization treatment for the production of industrially useful plastic materials.

At the present time, purification treatment for the removal of acetylenic impurities is generally carried out, commercially, by catalytic hydrogenation processes, or by processes involving solvent extraction, for example, by processes in which dimethylformamide or butyrolactone is employed as a selective solvent extraction agent. It has been found, however, that in some instances, these processes are either too expensive or fail to exhibit a sufficiently high degree of selectivity in effecting the removal of undesired acetylenic impurities. In other processes, although hydrogenation of acetylenes has been employed, hydrogen is not always readily available for such purposes. Hence, prior to the present invention, no efficient and commercially attractive method has been proposed for the removal of acetylenic impurities from mixtures thereof with olefins.

It is, therefore, an object of this invention to provide an improved method for the separation of acetylenic impurities from hydrocarbon mixtures.

Another object of the invention is to provide an improved method for the separation of acetylenic impurities from mixtures thereof with olefins obtained by the pyrolysis of hydrocarbons.

Still another object of the invention is to provide an improved method for the separation of acetylenic impurities, such as acetylene or methyl acetylene, from mixtures thereof with monoolefins, such as ethylene or propylene, or from mixtures thereof with diolefins, such as isoprene or butadiene, obtained by the pyrolysis of hydrocarbons and which is efficient and economically attractive from a commercial standpoint.

Other objects and advantages inherent in the invention will become apparent to those skilled in the art from the accompanying description and disclosure.

It has been found that an efficient and economical separation of acetylenic impurities from hydrocarbon mixtures containing them, and particularly from mixtures thereof with monoolefins or diolefins, can be obtained by a novel method of selective or preferential polymerization, under the conditions more fully hereinafter described, employing catalyst solutions comprising cuprous chloride and cupric chloride and conducting the selective polymerization under acid conditions. This improved method has been found highly selective in effecting polymerization of acetylenic impurities without causing substantial olefin polymerization or reaction to take place. In this manner, the disadvantages heretofore encountered in the processes of the prior art are obviated, resulting in the improvement in which substantially uncontaminated hydrocarbons, particularly monoolefins and diolefins, can be readily and economically recovered from mixtures in which the aforementioned acetylenic impurities are present. In addition, another attractive feature of the improved process resides in the ability to periodically or continuously regeneate the catalyst employed, as desired.

In carrying out the aforementioned selective or preferential polymerization treatment in which acetylenic impurities are separated from hydrocarbon mixtures thereof containing monoolefins and diolefins, it has been indicated that the catalyst solution comprises the salts of both cuprous chloride and cupric chloride. In this respect, it was determined that the use of cupric chloride, alone (i.e., without the presence of the cuprous chloride salt), is ineffective for the selective polymerization of the acetylenic material. On the other hand, the use of cuprous chloride, alone (i.e., without the presence of the cupric chloride salt), results in some degree of selective acetylenic polymerization taking place, but at such a low rate as to be considered ineffective from a commercial standpoint. From the foregoing, it was found that the presence of the cuprous ion in the catalyst solution is essential in order to attain any apparent degree of acetylene polymerization. Moreover, it was found that while the cuprous chloride solution is effective to only a very slight degree in attaining acetylene polymerization, the additional presence of cupric chloride results in the latter acting as a means for improving the selective polymerization of the acetylenics to such a degree as to make the process economically feasible. Thus, the criticality of the double salt cuprous chloride-cupric chloride catalyst solution, in effecting the selective acetylenic polymerization in the aforementioned hydrocarbon mixtures, was clearly established.

Apart from the criticality of employing the cuprous chloride-cupric chloride catalyst solutions in effecting acetylenic polymerization in the aforementioned hydrocarbon mixtures, it was also found that a further criticality resides in maintaining the polymerization system under specific acid conditions. Thus, it has been found that the degree of effecting acetylenic polymerization by the aforementioned catalyst solutions is markedly increased as the pH of the system is raised as high as about 4.5. If the pH is maintained below about 1.0, it has been found that the catalyst activity is substantially completely lost. On the other hand, if the pH of the system is maintained above about 4.5, there results such a high degree of loss of copper salts from solution that catalyst activity is also lost.

In order to raise the pH of the system to the desired value, the selective polymerization of the acetylenic impurity is carried out in the presence of a treating agent which may comprise oxygen, per se, air or other oxygen-containing compounds from which oxygen may be made available, for example, copper oxides, such as cuprous oxide ($Cu_2O$) or cupric oxide ($CuO$). The oxygen-containing material, in effect, acts as a pH adjusting agent, in that it performs the function of an alkalizing agent in raising the pH to a value as high as about 4.5. In addition, the oxygen-containing compound may regenerate cupric chloride, as shown in Equation 2 below.

In this respect, it has been found that if the polymerization is carried out with oxygen being present in such amount as to raise the pH value of the system substantially above 4.5, the excess oxygen present reacts with copper salts and results in the precipitation of copper oxides from the catalyst solution and thus, as previously indicated, results in a loss of catalyst and reduction or total loss of acetylenic polymerization. In general, from an economic standpoint, the selective polymerization of the acetylenic impurities from the aforementioned olefin-containing hydrocarbon mixtures, is preferably carried out in a system having a pH value between about 2.0 and about 4.0.

The improved process of the present invention is particularly applicable to the selective removal of acetylenic impurities from hydrocarbon mixtures in which the acetylenes have the general composition RC≡CH, in which R is selected from the group consisting of hydrogen and alkyl groups having from 1 to 4 carbon atoms in the group. Thus, the above-mentioned impurities may comprise acetylene itself or other acetylenic compounds, such as methyl acetylene, ethyl acetylene and propyl acetylene. The particular applicability of the present process resides, as previously indicated, in the selective removal of acetylene, methyl acetylene and higher boiling acetylenics of the above general composition from hydrocarbon mixtures containing such olefins as ethylene, propylene, isoprene and butadiene, or mixtures thereof, as are normally produced by the pyrolysis of such hydrocarbons as naphtha feed-stocks or dehydrogenation of $C_2$ and higher hydrocarbons. The general progressive reaction of the selective polymerization of the acetylenic impurity (from the olefin-containing hydrocarbon mixture) employing a cuprous chloride-cupric chloride solution and an oxygen-containing gas, may be represented as follows:

(1) $2RC\equiv CH + 2CuCl_2$
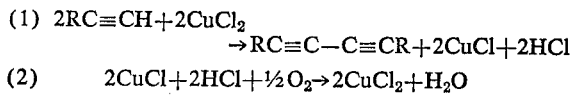
$\rightarrow RC\equiv C-C\equiv CR + 2CuCl + 2HCl$ (2) $2CuCl + 2HCl + \frac{1}{2}O_2 \rightarrow 2CuCl_2 + H_2O$ The selective polymerization of the acetylenic impurities in the hydrocarbon mixtures, as described above, is conducted at a temperature between about 60° C. and the boiling point of the cuprous chloride-cupric chloride catalyst solution. From an economic standpoint, the polymerization reaction is preferably conducted at a temperature between about 70° C. and about 100° C. The boiling point of the catalyst solution will, in each instance, be determined from the respective concentrations of the salts present. The cuprous chloride-cupric chloride catalyst is employed as an aqueous solution, comprising a 5 to 8 molar solution of cuprous chloride and a 0.01 to 3.0 molar solution of cupric chloride. In preparing the aqueous cuprous chloride solution of the desired molarity (for admixture with the cupric chloride solution), a solubilizing agent for the cuprous chloride is employed. This agent may comprise a solubilizing halide, such as ammonium chloride, sodium chloride, potassium chloride or lithium chloride. The amount of solubilizing agent employed is in the amount which is sufficient to dissolve the cuprous chloride, but not to exceed a mol ratio of about 1.2 of the solubilizing agent to the cuprous chloride. Insofar as the required molarity for each of the copper salt components is concerned, it will be noted that in the case of the cuprous chloride component, if an aqueous solution of this salt is employed which is below about 5 molar, such large quantities of solubilizing agent are required as to render the resulting catalyst solution inactive. If, on the other hand, the cuprous chloride component is employed in an amount which is above about 8 molar, there results a precipitation of the cuprous chloride salt. In the case of the cupric chloride component, if an aqueous solution of this salt is employed which is below about 0.01 molar, there results too little catalyst activity for polymerization to take place. If the cupric chloride component is employed in an amount which is above 3.0 molar, here also occurs a precipitation of the cupric chloride salt component.

The following examples will serve to illustrate, but are not intended to be considered as limiting, the improved process of the present invention in effecting the selective removal of acetylenic impurities from hydrocarbon mixtures containing them and olefin components.

*Example I*

A 900 ml. aqueous catalyst solution comprising 7.0 M of cuprous chloride, 6.9 M ammonium chloride and 0.7 M cupric chloride, is introduced into a glass reactor tube having a 2-inch diameter. A gaseous mixture comprising, approximately, 1% acetylene, 1% propylene, 48% ethane and 48% ethylene, is introduced through the bottom of the gas reactor and bubbled through the catalyst solution at the rate of 14 standard liters per hour. The catalyst solution is maintained at a temperature of approximately 90° C. Sufficient oxygen is added to the inlet gas to maintain the pH of the resulting solution in the reactor within the range of 2.0 and 3.5. The exit gas is analyzed, hourly, for acetylene content over a period of 34 hours' operation. Acetylene content is not detected by gas chromatographic analysis. The lower limit of detection by this method is 5 p.p.m. The remaining hydrocarbon components of the feed gas are found to have passed through the reactor unchanged and undiminished, with no acetylides of copper having been precipitated from the solution.

*Example II*

The procedure and the operating conditions employed in Example I are repeated, except that the gaseous hydrocarbon mixture comprises, approximately, 1% methyl acetylene, 49% propylene and 50% propane. This gaseous mixture is bubbled through the aforementioned 900 ml. of catalyst solution at the rate of 1 standard liter per hour. Sufficient $Cu_2O$ is introduced into the system (in place of oxygen) to maintain the pH of the resulting solution within the aforementioned range of 2.0 and 3.5. As described in Example I, the exit gas, analyzed hourly for methyl acetylene content over a 34 hour operation, reveals that the methyl aceylene limit is not in excess of 5 p.p.m., with the remaining hydrocarbon components of the feed gas having passed through the reactor unchanged and undiminished, with no acetylides of copper having been precipitated from the solution.

*Example III*

The procedure and the operating conditions employed in Example I are repeated, except that the gaseous hydrocarbon mixture comprises, approximately, 1% methyl acetylene, 25% butadiene, 25% 2-butene and 49% butane. The gaseous mixture is bubbled through the aforementioned 900 ml. of catalyst solution at the rate of 1 standard liter per hour. Sufficient air is introduced into the system to maintain the pH of the resulting solution within the aforementioned range of 2.0 and 3.5. As described in Example I, the exit gas, analyzed hourly for methyl acetylene content over a 34 hour operation, reveals that the methyl acetylene limit is not in excess of 5 p.p.m., with the remaining hydrocarbon components of the feed gas having passed through the reactor unchanged and undiminished, with no acetylides of copper having been precipitated from the solution.

*Example IV*

The procedure and the operating conditions employed in Example I are repeated, except that the gaseous hydrocarbon mixture comprises, approximately, 1% methyl acetylene, 25% isoprene, 49% n-pentane and 25% 2-pentene. This gaseous mixture is bubbled through the aforementioned 900 ml. of catalyst solution at the rate of 1 standard liter per hour. Sufficient oxygen is added to the inlet gas to maintain the pH of the system within the aforementioned range of 2.0 and 3.5. As described in Example I, the exit gas, analyzed hourly for methyl acetylene content over a 34 hour operation, reveals that the methyl acetylene limit is not in excess of 5 p.p.m., with the remaining hydrocarbon components having passed through the reactor unchanged and undiminished, with no acetylides of copper having been precipitated from the solution.

As will be noted from the foregoing description and examples, the efficacy of the present process in effecting the selective removal of acetylenic impurities from mixtures thereof with olefins and other hydrocarbons, over processes heretofore practiced, has been clearly demonstrated. It will be understood, of course, that the procedure described above is applicable not only to the selective removal of the particular acetylenic impurities from mixtures thereof with the olefins and hydrocarbons disclosed, but also to other mixtures which may contain such acetylenic impurities in admixture with other olefins and hydrocarbons and obtained not only by the pyrolysis of hydrocarbons, but also from any process in which such mixtures are produced. In addition, while specific embodiments of the present invention have been described for purposes of illustration, it should be understood that various modifications and adaptations thereof, which will be obvious to those skilled in the art, may be made without departing from the spirit of the invention.

I claim:

1. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride in the presence of an oxidizing agent effective to maintain a system having a pH between about 1.0 and about 4.5 to selectively polymerize the acetylene, and separating hydrocarbon from the polymerized acetylene as a product of the process.

2. A process for separating acetylene from a hydrocarbon mixture containing the same which comprises contacting said mixture with a solution comprising cuprous chloride and cupric chloride in the presence of an oxidizing agent effective to maintain a system having a pH between about 1.0 and about 4.5 to selectively polymerize acetylene, and separating hydrocarbon from polymerized acetylene as a product of the process.

3. A process for separating methyl acetylene from a hydrocarbon mixture containing the same which comprises contacting said mixture with a solution comprising cuprous chloride and cupric chloride in the presence of an oxidizing agent effective to maintain a system having a pH between about 1.0 and about 4.5 to selectively polymerize methyl acetylene, and separating hydrocarbon from polymerized methyl acetylene as a product of the process.

4. A process for separating acetylene from a hydrocarbon mixture containing the same and a monoolefin selected from the group consisting of ethylene and propylene which comprises contacting said mixture with a solution comprising cuprous chloride and cupric chloride in the presence of an oxidizing agent effective to maintain a system having a pH between about 1.0 and about 4.5 to selectively polymerize acetylene, and separating hydrocarbon from polymerized acetylene as a product of the process.

5. A process for separating methyl acetylene from a hydrocarbon mixture containing the same and a monoolefin selected from the group consisting of ethylene and propylene which comprises contacting said mixture with a solution comprising cuprous chloride and cupric chloride in the presence of an oxidizing agent effective to maintain a system having a pH between about 1.0 and about 4.5 to selectively polymerize methyl acetylene, and separating hydrocarbon from polymerized methyl acetylene as a product of the process.

6. A process for separating acetylene from a hydrocarbon mixture containing the same and a diolefin selected from the group consisting of isoprene and butadiene which comprises contacting said mixture with a solution comprising cuprous chloride and cupric chloride in the presence of an oxidizing agent effective to maintain a system having a pH between about 1.0 and about 4.5 to selectively polymerize acetylene, and separating hydrocarbon from polymerized acetylene as a product of the process.

7. A process for separating methyl acetylene from a hydrocarbon mixture containing the same and a diolefin selected from the group consisting of isoprene and butadiene which comprises contacting said mixture with a solution comprising cuprous chloride and cupric chloride in the presence of an oxidizing agent effective to maintain a system having a pH between about 1.0 and about 4.5 to selectively polymerize methyl acetylene as a product of the process.

8. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride in the presence of an oxidizing agent effective to maintain a system having a pH between about 2.0 and about 4.0 to selectively polymerize the acetylene, and separating hydrocarbon from the polymerized acetylene as a product of the process.

9. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride at a temperature between about 60° C. and the boiling point of said solution in the presence of an oxidizing agent effective to maintain a system having a pH between about 1.0 and about 4.5 to selectively polymerize the acetylene, and separating hydrocarbon from the polymerized acetylene as a product of the process.

10. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride at a temperature between about 70° C. and about 100° C. in the presence of an oxidizing agent effective to maintain a system having a pH between about 1.0 and about 4.5 to selectively polymerize the acetylene, and separating hydrocarbon from the polymerized acetylene as a product of the process.

11. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride at a temperature between 60° C. and the boiling point of said solution in the presence of an oxidizing agent effective to maintain a system having a pH between about 2.0 and about 4.0 to selectively polymerize the acetylene, and separating hydrocrabon from the polymerized acetylene as a product of the process.

12. A process for separating an acetylene having the general composition $RC \equiv CH$ in which R is selected from the group consisting of hydrogen and alkyl groups having from 1 to 4 carbon atoms from a hydrocarbon mixture containing the same which comprises contacting said mixture with a solution comprising cuprous chloride and cupric chloride at a temperature between about 70° C. and about 100° C. in the presence of an oxidizing agent effective to maintain a system having a pH between about 2.0 and about 4.0 to selectively polymerize the acetylene, and separating hydrocarbon from the polymerized acetylene as a product of the process.

13. A process for separating acetylene from a hydrocarbon mixture containing the same and a monoolefin selected from the group consisting of ethylene and propylene which comprises contacting said mixture with a solution comprising cuprous chloride and cupric chloride at a temperature between about 60° C. and the boiling point of said solution in the presence of an oxidizing agent effective to maintain a system having a pH between about 1.0 and about 4.5 to selectively polymerize acetylene, and separating hydrocarbon from polymerized acetylene as a product of the process.

14. A process for separating methyl acetylene from a hydrocarbon mixture containing the same and a monoolefin selected from the group consisting of ethylene and propylene which comprises contacting said mixture with a solution comprising cuprous chloride and cupric chloride at a temperature between about 60° C. and the boiling point of said solution in the presence of an oxidizing agent effective to maintain a system having a pH between about 1.0 and about 4.5 to selectively polymerize methyl acetylene, and separating hydrocarbon from polymerized methyl acetylene as a product of the process.

15. A process for separating acetylene from a hydrocarbon mixture containing the same and a diolefin selected from the group consisting of isoprene and butadiene which comprises contacting said mixture with a solution comprising cuprous chloride and cupric chloride at a temperature between about 60° C. and the boiling point of said solution in the presence of an oxidizing agent effective to maintain a system having a pH between about 1.0 and about 4.5 to selectively polymerize acetylene, and separating hydrocarbon from polymerized acetylene as a product of the process.

16. A process for separating methyl acetylene from a hydrocarbon mixture containing the same and a diolefin selected from the group consisting of isoprene and butadiene which comprises contacting said mixture with a solution comprising cuprous chloride and cupric chloride at a temperature between about 60° C. and the boiling point of said solution in the presence of an oxidizing agent effective to maintain a system having a pH between about 1.0 and about 4.5 to selectively polymerize methyl acetylene, and separating hydrocarbon from polymerized methyl acetylene as a product of the process.

17. The process of claim 1 in which the oxidizing agent comprises oxygen.

18. The process of claim 1 in which the oxidizing agent comprises air.

19. The process of claim 1 in which the oxidizing agent comprises cupric oxide.

20. A process for separating acetylene from a hydrocarbon mixture containing the same and a monoolefin selected from the group consisting of ethylene and propylene which comprises contacting said mixture with a solution comprising cuprous chloride and cupric chloride at a temperature between about 60° C. and the boiling point of said solution in the presence of an oxidizing agent effective to maintain a system having a pH between about 2.0 and about 4.0 to selectively polymerize acetylene, and separating hydrocarbon from polymerized acetylene as a product of the process.

References Cited in the file of this patent

UNITED STATES PATENTS

| | | |
|---|---|---|
| 2,318,988 | Craig | May 11, 1943 |
| 2,441,400 | Doumoni et al. | May 11, 1948 |
| 2,472,487 | Lovell | June 7, 1949 |
| 2,930,823 | Kronig et al. | Mar. 29, 1960 |